UNITED STATES PATENT OFFICE.

CHARLEY C. HORNSBY, OF KRUM, TEXAS, ASSIGNOR OF ONE-HALF TO ROBERT F. BELL, OF FORT WORTH, TEXAS.

PROCESS OF BRAZING.

No. 841,151.     Specification of Letters Patent.     Patented Jan. 15, 1907.

Application filed March 24, 1906. Serial No. 307,797.

*To all whom it may concern:*

Be it known that I, CHARLEY C. HORNSBY, a citizen of the United States, residing at Krum, in the county of Denton, State of Texas, have invented certain new and useful Improvements in a Process of Brazing, of which the following is a specification.

My invention relates to a brazing process; and the object is to provide a process which is particularly useful in mending broken castings. I have found that a compound containing brass filings or cuttings will flow throughout the joint to be brazed and that iron filings or cuttings make a body for the brazing compound used.

In carrying out this improved process I take equal parts of cuttings or filings of iron and of brass and mix the same. Then take a quantity of powdered or pulverized borax equal in volume to the combined volume of iron and brass filings and mix well with the iron and brass filings. This composition may be put in bottles and kept in stock ready for use at any time. This composition is ready to be mixed with another composition below described. The other composition consists of muriatic acid combined with zinc, usually sheet-zinc, and with water equal in quantity to one-third the volume of the acid. When the parts of a casting are to be brazed together, a thick paste is made of the two compositions. The paste is placed on the parts of the casting to be brazed together, and heat is applied to a degree sufficiently high to melt the brass, but not high enough to melt the iron filings or cuttings or to melt the parts of the casting to be brazed. Then apply powdered borax to the parts to be brazed, which melts at once. Then apply brass to the parts to be brazed, which parts should be hot enough to melt the brass which is applied. The brass and the melted borax flow together about the parts to be brazed, and the brass knits into or cements with the brass and iron filings in the joints and also adheres to the broken parts. The brass in the compound insures a perfect flow throughout the joint to be brazed, and the iron filings or cuttings form a body to add strength to the joint.

This process has been thoroughly demonstrated in actual use, and it makes a joint more difficult to break than the original casting.

Having fully described my invention, what I claim as new, and desire to secure by Letters Patent, is—

1. The brazing process herein described consisting of mixing iron and brass filings and borax, mixing with this composition muriatic acid combined with zinc and water, applying the mixture to the casting to be joined, applying heat to melt the brass-filings, treating the joint with borax while the joint is hot, and applying brass to the joint while hot enough to melt brass.

2. The brazing process consisting of mixing iron and brass filings in equal parts with powdered borax, the volume of borax being equal to the combined volume of the brass and iron filings, mixing with this composition muriatic acid combined with zinc and with water, the water being equal to one-third the quantity of acid, applying this mixture to the parts of castings to be brazed, applying sufficient heat to melt the brass-filings, and treating the heated portions with powdered borax and then with brass, the heat being sufficient to melt the brass.

In testimony whereof I set my hand, in the presence of two witnesses, this 5th day of March, 1906.

CHARLEY C. HORNSBY.

Witnesses:
   A. L. JACKSON,
   BERT L. McDILL